Patented Dec. 9, 1930

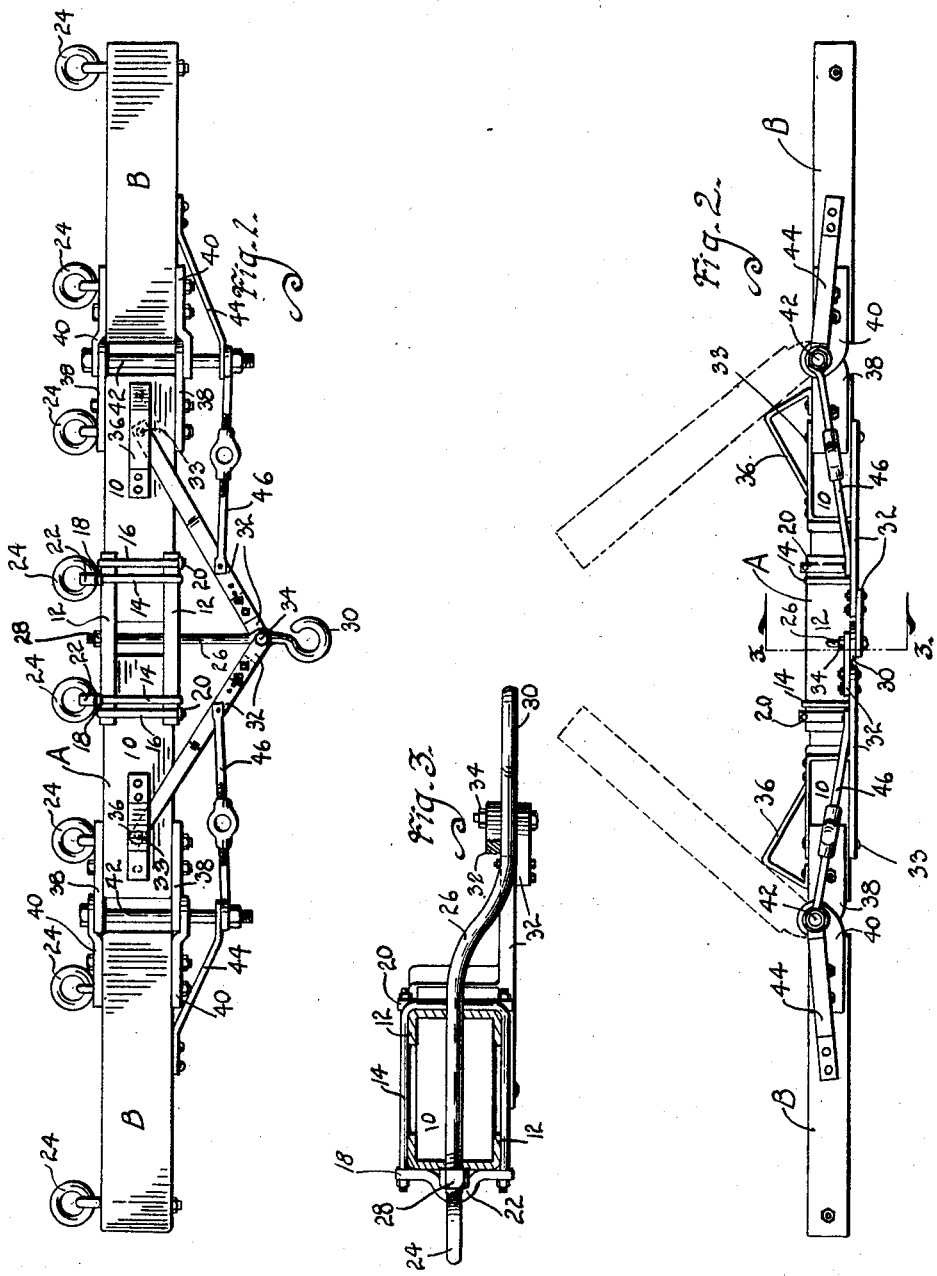

1,784,576

UNITED STATES PATENT OFFICE

NELS CHRISTIANSEN AND CHRIS MORTENSEN, OF RINGSTED, IOWA

FLEXIBLE HINGED DRAWBAR FOR HARROWS

Application filed August 26, 1929. Serial No. 388,431.

The object of our invention is to provide a hinged draw bar for harrows of simple, durable and comparatively inexpensive construction.

A further object is to provide a draw bar consisting of a central or main bar and end or wing bars hinged to the ends thereof to permit the end bars to be folded over the main bar for passing the harrow through gates, barn doorways, etc.

Heretofore, draw bars of this character have been employed, but have met with considerable difficulty and dissatisfaction, in that the bar has a tendency to roll and assume numerous unfavorable positions, due to the use of unsatisfactory hitching means, which lack the required rigidity necessary to maintain the draw bar in proper relation, attached to the harrow.

The invention to this end includes a draft hitch rod extending from the main bar with a pair of braces extending diagonally therefrom and having turn-buckle tie rod connections with hinge pins that extend forwardly from the hinge connections of the end bars to the main bar.

The principal object of our invention is to provide, in a hinged draw bar, improved rigid hitching connections for insuring that the pivoted draw bar members will always remain in their proper relations during normal use of the device.

A further object of this invention resides in the provision of novel means for pivotally connecting the main and wing bars together, whereby greater flexibility will be acquired in its use in connection with a harrow.

Another object resides in providing means whereby the wing bars may be supported at an inclined position over the main bar, so that the same may be quickly moved to their operative position without the necessity of lifting them from an otherwise flat disposition upon the main section.

Still another object is to provide the main bar extensible with novel connecting means for accomplishing such extension and to make the diagonal braces and tie rods adjustable to accommodate the main bar when extended to different lengths.

With these and other objects in view our invention consists in the construction, arrangement and combination of the various parts of our device, whereby the objects contemplated are attained, as hereinafter more fully set forth, pointed out in our claims, and illustrated in the accompanying drawings, in which:

Figure 1 is a plan view of one form of our improved draw bar construction.

Figure 2 is a front elevation of the same, showing the end bars in their folded positions over the main bar; and Figure 3 is an enlarged sectional view on the line 3—3 of Figure 2.

Our draw bar construction consists of a main bar A and wing bars B. The main bar A consists of a pair of bar members 10 connected by a pair of channel-shaped connectors 12 fitting over the forward and rear edges of the bar members 10, as best shown in Figure 3 of the drawings.

The connectors 12 are securely clamped against the forward and rearward edges of the bar members 10 by means of U-bolts 14 and 16 and bars 18 and 20. The bars 18 have rearwardly looped portions 22 to receive harrow rings 24.

A draft hitch rod 26 extends through the channel-shaped connectors 12 and has a nut 28 on its rearward end. The forward end of the draft hitch rod 26 is formed into an eye 30. A pair of braces 32 extend from a pivot bolt 34 in the draft hitch rod 26 diagonally back to the main bar A with which they are pivotally connected as by rivets 33.

The braces 32 are extensible by being formed in two pieces and bolted together, a plurality of openings being provided for the bolts when in different positions of adjustment. A wing bar rest 36 is secured to each bar member 10 over the pivotal connection of the rear ends of the braces 32 thereto.

Hinge plates 38, which may be called upwardly curved plate extensions of the main bar A, are secured to the ends of the main bar and similar hinge plates 40 are secured to the inner ends of the wing bars B. Hinge pins 42 extend through the hinge plates 38 and 40 for providing pivotal connections between the ends of the main bar A and the inner ends of the wing bars B, whereby the wing bars B may be caused to assume the dotted line position shown in Figure 2 when it is desired to drive the harrow through a gate or barn door.

Our present invention has to do particularly with a means for preventing backward bending of the wing bars B or in other words, a means to keep the bars A and B always in alignment regardless of the weight of the harrows being pulled behind the draw bar structure. It is desirable to provide such a means which does not interfere with the movement of the wing bars B to the dotted line position shown in Figure 2.

We have accordingly extended the hinge pins 42 forwardly as best shown in Figure 1 and braced them against bending relative to the bars B by means of brace members 44. The forward extensions of the hinge pins 42 are then braced to the draft hitch rod 26 by means of turn-buckle tie rods 46.

Thus, the pulling strain on the draft hitch rod 26 is transmitted through the tie rod 46 and brace 44 to each wing bar B to prevent backward swinging movement thereof.

It will be noted that the draw bar is flexible because of the hinged connection of the end bars B to the main bar A and the hinged connection of the braces 44 to the hinge pins 42. This construction permits the draw bar to follow at all times uneven surfaces of the ground over which it is passing, without permitting any lagging of the wing bars. In other words the wing bars B will at all times be maintained in alignment with the main bar A, so that the harrow sections are always kept in their proper relative positions, regardless of the upward or downward swinging of the wing bars B.

The braces 32 are made extensible and the tie rods 46 are of turn-buckle construction, whereby they may be adjusted when the bar members 10 are adjusted lengthwise of the connectors 12 for shortening or lengthening the main bar A. For a similar reason, the rearward ends of the braces 32 are pivoted at 33 to the bar members 10. Thus, when the main bar A is lengthened, the braces 32 and tie rods 46 must likewise be lengthened so that the braces 32, tie rods 46 and braces 44 may all be kept under the proper tension to keep the wing bars B in exact alignment with the main bar A.

Some changes may be made in the construction and arrangement of the parts of our device without departing from the real spirit and purpose of our invention, and it is our intention to cover by our claims, any modified forms of structure or use of mechanical equivalents, which may be reasonably included within their scope.

We claim as our invention:

1. In a hinged draw bar for harrows, a main bar, and a pair of wing bars, said wing bars and main bar being provided with upwardly curved plate extensions forming hinge members at adjacent ends, pin means for pivotally connecting said hinge members at their ends, said pins having forwardly extending ends from the hinge members, and a draft hitch device having a turn-buckle connection with said forwardly extending pins.

2. In a hinged draw bar for harrows, an extensible main bar, a pair of wing bars, means for hingedly connecting the wing bars to opposite ends of the main bar, said main bar comprising a pair of sections connected together by channel members and U-bolts substantially as disclosed.

3. In a hinged draw bar for harrows, a main bar, and a pair of wing bars, said wing bars and main bar being hinged together by means of hinge pins, a draft hitch rod extending forwardly from said main section, brace members extending from adjacent the forward end of said draft hitch rod to said main bar and tie rods extending from said braces to said hinge pins, said main bar, braces and tie rods being extensible.

4. In a hinged draw bar for harrows, a main bar, and a pair of wing bars, said wing bars and main bar being hinged together by means of hinge pins, a draft hitch rod extending forwardly from said main section, brace members extending from adjacent the forward end of said draft hitch rod to said main bar and tie rods extending from said braces to said hinge pins, said main bar, braces and tie rods being extensible, and said braces being pivoted to said main bar.

5. In a draw bar for harrows, a main bar of extensible construction comprising a pair of bar members, a connector for said members, said members being slidable relative thereto, a rigid hitch member extending forward from said connector, braces divergently arranged and engaging said bar members, said braces being extensible to allow for extension of said main bar, said hitch member including a rod extended through said connector, and a nut on said rod engaging the rearward face of said connector.

6. In a draw bar for harrows, a main bar of extensible construction comprising a pair of bar members, a connector for said members, said members being slidable relative thereto, a rigid hitch member extending forward from said connector, braces divergently arranged and engaging said bar members, said braces being extensible to allow for extension of said main bar, said hitch member including a rod extended through said connector, and a nut on said rod engaging the rearward face of said connector, and turn-buckle tie rod connections between said braces and the ends of said main bar.

Des Moines, Iowa, August 15, 1929.
NELS CHRISTIANSEN.
CHRIS MORTENSEN.